United States Patent [19]

Pressley

[11] 4,073,506

[45] Feb. 14, 1978

[54] VEHICLE TOWING APPARATUS

[76] Inventor: Paul E. Pressley, 312 Whitecliff Drive, Vallejo, Calif. 94590

[21] Appl. No.: 671,002

[22] Filed: Mar. 26, 1976

[51] Int. Cl.$^2$ .............................................. B60D 1/14
[52] U.S. Cl. .................................. 280/402; 280/491 E
[58] Field of Search ................... 280/402, 482, 491 R, 280/491 E, 495, 500, 501, 505, 504

[56] References Cited

U.S. PATENT DOCUMENTS

| | | | |
|---|---|---|---|
| 1,342,507 | 6/1920 | McNamara | 280/495 X |
| 2,570,933 | 10/1951 | Fobes | 280/501 |
| 3,510,146 | 5/1970 | Hartman | 280/491 E |
| 3,664,687 | 5/1972 | Nutt | 280/402 |
| 3,716,255 | 2/1973 | Morris | 280/491 E |
| 3,759,547 | 9/1973 | Ankeny | 280/491 E |

*Primary Examiner*—Joseph F. Peters, Jr.
*Assistant Examiner*—R. Schrecengost
*Attorney, Agent, or Firm*—Boone, Schatzel, Hamrick & Knudsen

[57] ABSTRACT

A vehicle towing apparatus comprised of a rigid metal plate having an elongated midportion, a leading end portion which is bent upwardly relative to the midportion and a trailing end portion which is bent downwardly relative to the midportion, and stiffening webs extending longitudinally along the midportion and the trailing end portion. Apertures are provided in the two end portions to facilitate fastening the towing apparatus to suitable coupling structures on a towing vehicle and a towed vehicle. An alternative embodiment includes a pair of spaced apart upstanding plates or flanges which are secured to the top of the trailing end portion to provide a coupling unit for mating with a similar structure carried by the vehicle to be towed.

9 Claims, 5 Drawing Figures

Fig_1

VEHICLE TOWING APPARATUS

BACKGROUND OF THE INVENTION

Heretofore vehicle towing apparatus has typically taken the form of a simple mechanical linkage for connecting the rear bumper of the towing vehicle to the front bumper of the towed vehicle in such a manner that the towed vehicle was pulled with all four wheels on the ground. This type of tow is disadvantageous in that it usually results in excessive front tire wear of the trailing vehicle caused by directional changes and slight tracking differences between the two vehicles. In addition, during sharp turns jackknifing and lateral skidding of the front wheels makes driving of the towing vehicle both awkward and burdensome. Another disadvantage of four wheel towing is that it may require disconnection of the power steering unit and/or drive shaft of the towed vehicle.

The only known devices which enable towing with the front wheels of the towed vehicle off the ground are the wrecker type mechanisms which include a three point towing apparatus in combination with a lifting device. Although such devices obviously serve their function quite well, they are not suited for use on the back of a general purpose vehicle, they are mechanically complex and are thus, expensive.

SUMMARY OF THE PRESENT INVENTION

It is therefore an object of the present invention to provide a mechanically simple towing apparatus which requires little if any modification of either vehicle and can be used to connect the frame of a towing vehicle to the frame of a towed vehicle and at the same time support the front end of the towed vehicle in an elevated position.

Briefly, the preferred embodiment is comprised of a rigid metal plate having an elongated midportion, leading end portion which is bent upwardly relative to the midportion and a trailing end portion which is bent downwardly relative to the midportion, and stiffening webs extending longitudinally along the midportion and the trailing end portion. Apertures are provided in the two end portions to facilitate bolting of the device to suitable coupling structures on both vehicles.

In an alternative embodiment a pair of spaced apart, upstanding plates are secured to the top of the trailing end portion to provide a coupling unit for mating with a similar structure carried by the vehicle to be towed.

An advantage of the present invention is that it requires little modification of either vehicle.

Another advantage of the present invention is that it can be easily installed with simple tools.

Another advantage of the present invention is that it holds the towed end of the towed vehicle in an elevated position without requiring more than a simple one-bolt connection to the towing vehicle.

These and other objects and advantages of the present invention will no doubt become apparent to those skilled in the art after having read the following detailed description of the preferred embodiments which are illustrated in the several figures of the drawing.

IN THE DRAWING

DETAILED DESCRIPTION OF THE PREFERRED EMBODIMENTS

Figure 1:
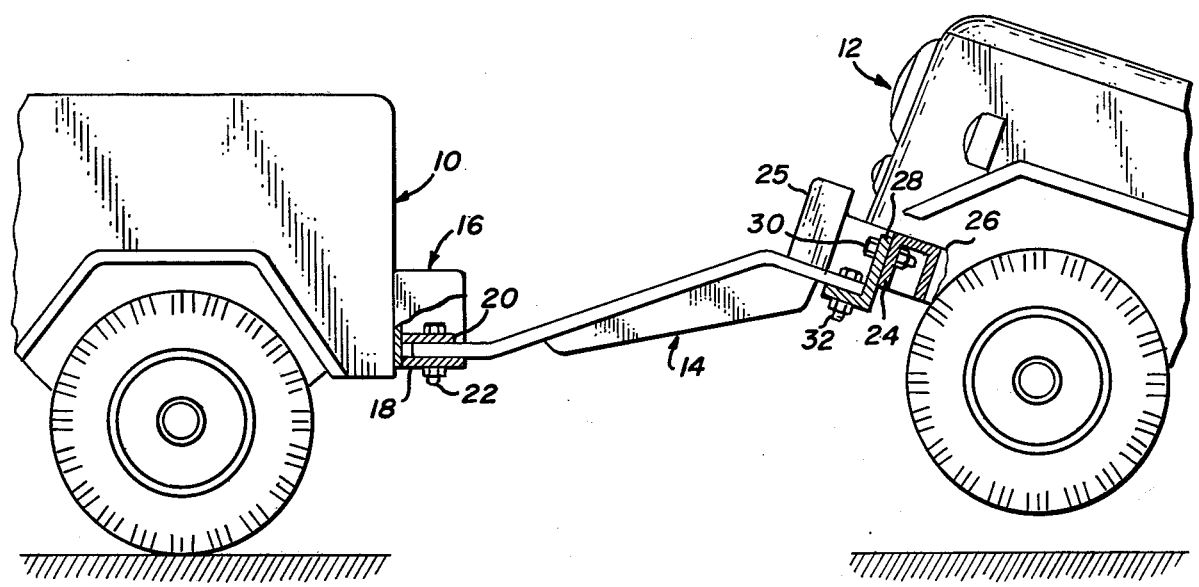
FIG. 1 is a pictorial view illustrating a preferred embodiment of a towing apparatus in accordance with the present invention.

Referring now to FIG. 1, there is shown a towing vehicle 10, a towed vehicle 12 and a towing apparatus 14 in accordance with the present invention, the latter coupling the two vehicles together in a towing configuration. In order to accommodate the towing apparatus 14, the centermost portion of the bumper structure 16 is provided with a standard pin type hitch including a rigid bottom plate 18 and a rigid top plate 20, both of which are securely fastened to the frame of vehicle 10. A hole is drilled through both plate 18 and plate 20 to accommodate a one-inch diameter bolt or pin 22.

The towed vehicle is modified by adding a cross member 24 just behind the bumper 25 and between the two longitudinal frame extensions 26. The cross member 24 is typically located approximately 6 to 9 inches behind the front face of bumper 25. An angle bracket 28 is fastened to the front side of cross member 24 by a pair of bolts 30 which are passed through holes provided therein. The top side of the lower rail of bracket 28 is spaced beneath the lower edge of the heavy duty bumper 25 by approximately three quarters of an inch.

Figure 2:
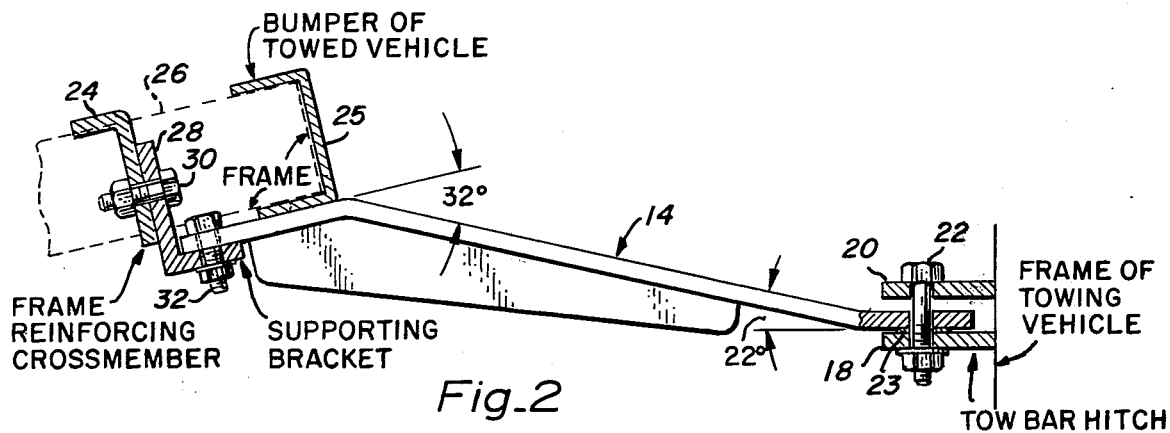
FIG. 2 is a side view of the towing apparatus illustrated in FIG. 1.
Figure 3:
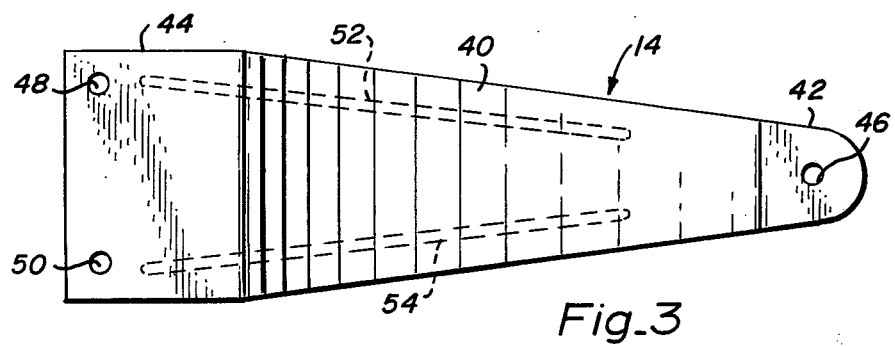
FIG. 3 is a top view of the towing apparatus illustrated in FIG. 1.

Turning now additionally to FIG. 2 and FIG. 3 of the drawing, it will be noted that the towing apparatus 14 is comprised of a metal plate which in the preferred embodiment is of ⅜ inch thickness mild steel. The steel plate is comprised of an elongated flat midportion 40, a flat leading end portion 42 which is deflected upwardly relative to midportion 40 by an angle of approximately 22°, and a flat trailing end portion 44 which is deflected downwardly relative to midportion 40 by an angle of approximately 32°. A 1 1/32 inch hole 46 is provided in portion 42 and a pair of ¾ inch holes 48 and 50 are provided in portion 44 for receiving fastening bolts 32. As an alternative to the use of the bracket 28 the end of portion 44 could be upturned to provide an equivalent structure. In such case the bolts 30 extending through the upturned flange would be the principal fastening means. Extending longitudinally along approximately 70% of midportion 40 and approximately 50% of trailing portion 44 are a pair of stiffening webs 52 and 54 which are welded to the bottom surfaces of portion 40 and portion 44. The webs 52 and 54 are of one-half inch thickness and provide additional strength for maintaining the towing apparatus rigid.

In order to couple the towed vehicle 12 to the towing vehicle 10, the vehicle 12 is either jacked or run up on blocks until its wheels are approximately 8 or 9 inches above the ground. The towing apparatus 14 is then positioned as illustrated in FIGS. 1 and 2 and the bolts 32 are installed through the holes in the supporting bracket 28 and the holes 48 and 50 in the end portion 44. The towing vehicle is then backed into place to align the hole 46 in the towing end portion 42 with the pin holes in plates 18 and 20, and the one inch diameter pin 22 is inserted. Note in FIG. 2 that a washer or fixed circular shoulder 23 provides a bearing surface for the portion 42 to pivot upon. Once pin 22 is secured in place, the jack or blocks used to raise vehicle 12 may be removed and the front end of the vehicle will remain entirely supported by the towing apparatus 14.

So long as the rear springs of vehicle 10 are stiff enough so as not to be depressed more than two or three inches by the weight of vehicle 12, the raised wheels of vehicle 12 will be carried between 5 and 8 inches above the ground, which is clearly adequate for most flat surface towing. But it will be noted that even should the towing vehicle pass over a dip or rise which would allow the front wheels to touch the surface, the wheels will merely roll and no adverse consequences will occur. Having once reached the destination, the installation procedure is reversed to demount the towed vehicle 12 from the towing apparatus. It should also be mentioned that the raised wheels of the towed vehicle are normally prevented from drooping by the use of special chains which are passed over the frame and under the axle on each side of the vehicle.

Figure 4:
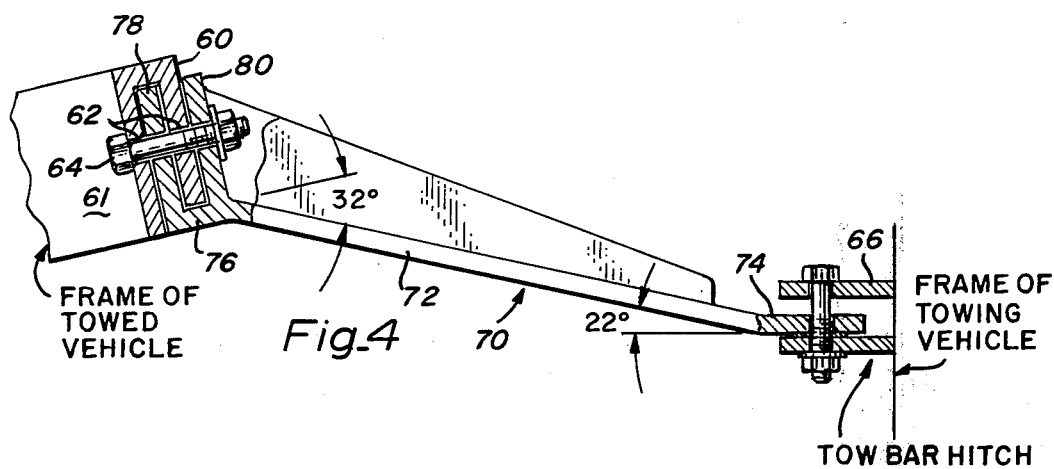
FIG. 4 is a side view of an alternative embodiment of a towing apparatus in accordance with the present invention.
Figure 5:
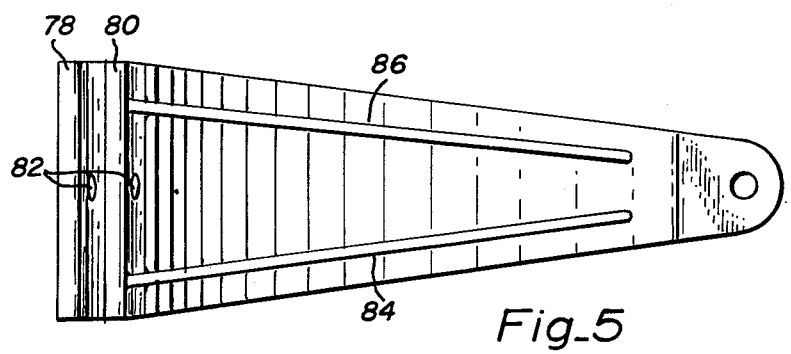
FIG. 5 is a top view of the alternative embodiment shown in FIG. 4.

Turning now to FIGS. 4 and 5 of the drawing an alternative embodiment of the present invention is illustrated which is adapted to mate with a different type of towed vehicle bracket such as might be used on the back of a jeep or other vehicle to be towed. In the illustrated embodiment, the bracket 60 consists of an inverted, U-shaped channel which is welded or otherwise fastened to the rear extremity of the frame 61 of the towed vehicle. Bracket 60 is provided with an opening 62 which extends through both sides thereof for receiving a bolt 64 which is shown in FIG. 4. The hitch mechanism on the towing vehicle is identical to that previously described and is shown at 66.

The towing apparatus 70 is likewise comprised of an elongated midportion 72, and up-turned leading end portion 74, and a down-turned trailing end portion 76. However, the leading end portion 76 is foreshortened relative to the corresponding portion of the previously described towing apparatus and includes a pair of upstanding transverse plates 78 and 80 each of which includes an aperture 82 therein that is aligned with apertures 62 in bracket 60. Welded to the plate 80 and the top of midportion 72 are a pair of stiffening webs 84 and 86 which serve substantially the same purpose as do the stiffening webs 52 and 54 described in the previous embodiment.

In order to couple a towing and towed vehicle together using the apparatus 70, the same procedure previously illustrated is followed and the results are identical. The principal difference is that this particular embodiment is thought to be more suited for use at the rear of a vehicle than at the front because of the nature of the bumper structure and frame termination at the rear end of jeep-type vehicles.

When using either of the embodiments described above, approximately 31% of the towed vehicle weight will be supported by the towing vehicle and the elevated tires of the towed vehicle will clear the pavement by approximately 7 inches. As a result, towing vehicles with light duty suspension systems may require the addition of heavy duty shocks and springs to support the additional weight of the towed vehicle.

Among the advantages of the present invention are that its use eliminates uneven tracking of the trailing vehicle; it eliminates excessive wear on the tires of both the towed vehicle and the towing vehicle; it provides fuel savings since there is less road drag with only two wheels of the towed vehicle on the pavement instead of all four as with other towing apparatus; it allows sharp turns to be made without jackknifing or lateral skidding of the front wheels of the towed vehicle; when a front end hookup is used it eliminates the need to disconnect the power steering units; when a rear end hookup is used it eliminates the need to disconnect the drive shaft of the towed vehicle; and it allows the vehicle to be towed with the same control and handling ease as is experienced in towing a two-wheeled trailer.

Although only two embodiments of the present invention have been described above, it will be readily appreciated that other modifications thereof will no doubt become apparent to those skilled in the art. For example, additional stiffening webs could be utilized, and similar structures could be duplicated by using bar steel or tubular steel. Furthermore, a wide variety of bracket fixtures and matching terminal configurations could be utilized. For example, the leading end portion could be adapted to include a socket for receiving a ball type hitch carried by the towing vehicle. Such alterations and modifications are however deemed to be obvious after having read the above disclosure and it is intended that the appended claims be interpreted as covering all such alterations and modifications as fall within the true spirit and scope of the invention.

What is claimed is:

1. A vehicle towing apparatus comprising a rigid plate including;
    an elongated midportion having a top surface and a bottom surface;
    a leading end portion which is deflected upwardly relative to the longitudinal dimension of said midpoint at a first angle between 20° and 25°; and
    a trailing end portion which is deflected downwardly relative to the longitudinal dimension of said midportion at a second angle between 30° and 35°;
    stiffening web means connected to and extending longitudinally along a majority of the length of said midportion and connected to said trailing end portion; and
    means associated with said leading end portion for coupling the apparatus to a towing vehicle and means associated with said training end portion for coupling the apparatus to a towed vehicle whereby the coupled end of said towed vehicle is carried in an elevated position above its normal resting position and is supported in such elevated position by the towing vehicle.

2. A vehicle towing apparatus as recited in claim 1 wherein said coupling means associated with said trailing end portion includes a pair of apertures disposed proximate the distal end of such portion for receiving bolt means for fastening same beneath and behind the bumper of the towed vehicle.

3. Vehicle towing apparatus as recited in claim 2 wherein said web means are affixed to the bottom surface of said midportion and the bottom surface of said trailing end portion.

4. A vehicle towing apparatus as recited in claim 1 wherein said trailing end portion terminates in an up-turned laterally extending flange having means for coupling same to the frame of the towed vehicle.

5. A vehicle towing apparatus as recited in claim 1 wherein said means for coupling said trailing end portion to the towed vehicle includes a pair of upstanding spaced apart flanges rigidly secured to the upper surface of said towed end portion and wherein said stiffening webs are affixed to the top surface of said midportion and the facing surface of the nearest upstanding flange, said flanges including means for attaching same to the towed vehicle.

6. A rigid vehicle towing apparatus comprising:
an elongated midportion;
a leading end portion formed integral with one end of said midportion and deflected upwardly relative thereto at a first angle between 20° and 25°; and
a trailing end portion formed integral with the opposite end of said midportion and deflected downwardly relative thereto at a second angle between 30° and 35°,
whereby when said leading end portion is affixed to a towing vehicle in a generally horizontally extending disposition and said trailing end portion is affixed to a towed vehicle with its longitudinal dimensions extending generally parallel to the frame of the towed vehicle, the coupled end of the towed vehicle will be held in an elevated position by said towing apparatus and will be supported by the towing vehicle.

7. A vehicle towing apparatus as recited in claim 6 and further comprising stiffening web means affixed to said midportion and said trailing end portion and extending along substantial portions of the longitudinal lengths thereof.

8. A vehicle towing apparatus as recited in claim 7 wherein said web means is affixed to the lower surface of said midportion and said trailing end portion.

9. A vehicle towing apparatus as recited in claim 5 and further comprising stiffening web means affixed to said midportion and said trailing end portion, and wherein said trailing end portion includes an upturned flange which is adapted to be secured to a towed vehicle.

* * * * *